(12) United States Patent
Jeon et al.

(10) Patent No.: US 7,347,630 B1
(45) Date of Patent: Mar. 25, 2008

(54) FIBER OPTIC TRANSCEIVER HAVING A FLOATING TRANSMITTER PORT

(75) Inventors: Yong M. Jeon, Berkeley, CA (US); Matt Schwiebert, Cupertino, CA (US)

(73) Assignee: Avago Technologies Fiber IP Pte Ltd., Singapore (SG)

( * ) Notice: Subject to any disclaimer, the term of this patent is extended or adjusted under 35 U.S.C. 154(b) by 0 days.

(21) Appl. No.: 11/567,556

(22) Filed: Dec. 6, 2006

(51) Int. Cl.
*G02B 6/36* (2006.01)

(52) U.S. Cl. .............................. 385/88; 385/55; 385/86; 385/92

(58) Field of Classification Search ............ 385/53–92
See application file for complete search history.

(56) References Cited

U.S. PATENT DOCUMENTS

| | | | | |
|---|---|---|---|---|
| 5,159,651 A | * | 10/1992 | Gandy | 385/56 |
| 5,230,032 A | * | 7/1993 | Muzslay | 385/66 |
| 5,633,963 A | * | 5/1997 | Rickenbach et al. | 385/25 |
| 5,642,450 A | * | 6/1997 | Oda | 385/60 |
| 6,358,066 B1 | * | 3/2002 | Gilliland et al. | 439/76.1 |
| 7,213,980 B2 | * | 5/2007 | Oki et al. | 385/92 |
| 2002/0159714 A1 | * | 10/2002 | Lampert | 385/72 |
| 2006/0204178 A1 | * | 9/2006 | Theuerkorn et al. | 385/59 |

* cited by examiner

*Primary Examiner*—Frank G. Font
*Assistant Examiner*—Hung Lam

(57) ABSTRACT

The invention provides a "floating" port assembly of a receptacle of a transceiver. The configuration allows the transmitter port assembly to float conically (e.g., angularly from side to side and up and down) relative to the axial direction of the receptacle sleeve inside of the receptacle when a mechanical load placed on an optical fiber cable connected to the receptacle is transferred to the sleeve of the port assembly. The port assembly has a spring-return mechanism that biases the assembly such that it returns to its original center position when the load is removed. This floating isolates the ferrule of the optical fiber cable and the sleeve of the receptacle from external loadings transmitted via the fiber optic cable. Isolating the ferrule and the sleeve from the external loading dramatically reduces the effects of these external wiggle loads on the optical performance of the transmitter of the transceiver.

18 Claims, 6 Drawing Sheets

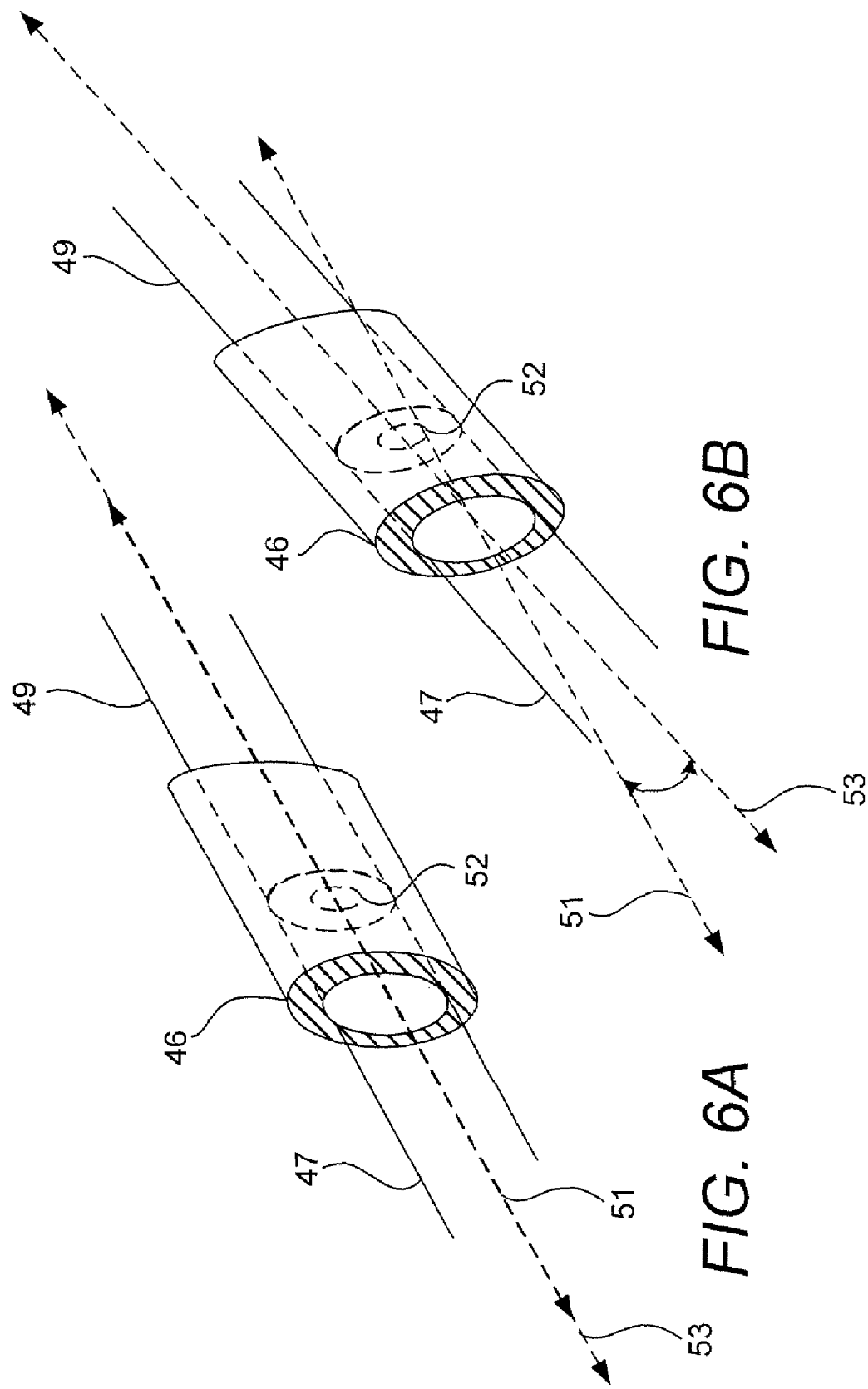

FIBER OPTIC TRANSCEIVER HAVING A FLOATING TRANSMITTER PORT

TECHNICAL FIELD OF THE INVENTION

The invention relates to a transceiver for use in optical communications systems. More particularly, the invention relates to a transceiver having a port that floats within a receptacle of the transceiver to isolate the ferrule and sleeve from external loading transferred from an optical fiber cable.

BACKGROUND OF THE INVENTION

Optical fiber transceivers launch and receive light from optical fiber cables. Optical fiber cables are subject to mechanical loading during installation and use. During use, the cables are transmitting optical signals, and mechanical loading on the cables, such as tugging or pulling forces exerted on the cables, can degrade the optical signal by reducing the optical coupling efficiency between the optical fiber and the transmitter port of the transceiver. The problem is referred to in the optical communications industry as "wiggle" or "wiggle losses".

A variety of techniques have been used to eliminate or reduce wiggle and wiggle loss. One technique involves permanently fusing an optical fiber of an optical fiber cable to the transmitter port of the transceiver. This configuration is commonly referred to as a pigtail. One disadvantage of this approach is that the fiber cannot be unplugged from the transmitter module. In many cases, it is desirable to be able to unplug an optical fiber cable from one transmitter port and plug it into a different transmitter port. Fusing a fiber to a transmitter port obviously eliminates this possibility.

Another technique involves using a split-sleeve receptacle having a rigidly mounted port. With this technique, an optical fiber cable plugs into a receptacle of the transceiver. The optical fiber within the optical fiber cable is surrounded by a precisely ground ceramic ferrule, which is guided into the receptacle by a precisely formed sleeve of the receptacle. This sleeve has a split that is compressed into a final inner diameter once the cable has been inserted into the receptacle so that the inner diameter of the sleeve closely matches the outer diameter of the ferrule. Unfortunately, the split also weakens the sleeve, allowing the ferrule to move with respect to the transmitter when the fiber cable is loaded, which results in wiggle loss.

Another technique involves using a solid-sleeve receptacle having a rigidly mounted port. With this technique, the optical fiber cable plugs into a transceiver receptacle. The optical fiber in the optical fiber cable is surrounded by a precisely ground ceramic ferrule, which is guided into the receptacle by a precisely formed sleeve. This sleeve does not have a split, but is a complete cylinder (i.e., like a gun barrel) having an inner diameter that is intended to precisely match the diameter of the ferrule. The disadvantage of this configuration is that the inner diameter of the sleeve and the diameter of the ferrule often do not precisely match each other due to variations in ferrule diameter. Because the sleeve is solid and cannot be precisely compressed to achieve the exact inner diameter needed to precisely match the ferrule diameter, a relatively poor alignment of the optical fiber to the transmitter obtained. This results in optical losses that vary in accordance with variations in the ferrule diameter.

A need exists for a transmitter port of a transceiver that provides improved optical coupling efficiency between a transmitter port of a transceiver and an optical fiber of an optical fiber cable.

BRIEF DESCRIPTION OF THE DRAWINGS

FIG. 6A illustrates a diagram that depicts the axial alignment of the sleeve, the ferrule, and the fiber stub when the port assembly is in its center position.

FIG. 6B illustrates the same diagram shown in FIG. 6A except that the port assembly has moved some angular distance relative to the port center axis due to the an angular moment being exerted on the sleeve by the ferrule.

DETAILED DESCRIPTION OF ILLUSTRATIVE EMBODIMENTS

The invention provides a "floating" port assembly of a receptacle of a transceiver. The configuration allows the transmitter port assembly to float conically (e.g., angularly from side to side and up and down) relative to the axial direction of the receptacle sleeve inside of the receptacle when a mechanical load placed on an optical fiber cable connected to the receptacle is transferred to the sleeve of the port assembly. The port assembly has a spring-return mechanism that returns the port assembly to its original center position when the load is removed. This floating isolates the ferrule of the optical fiber cable and the sleeve of the receptacle from external loadings transmitted via the fiber optic cable. Isolating the ferrule and the sleeve from the external loading dramatically reduces the effects of these external wiggle loads on the optical performance of the transmitter of the transceiver.

Figure 1:
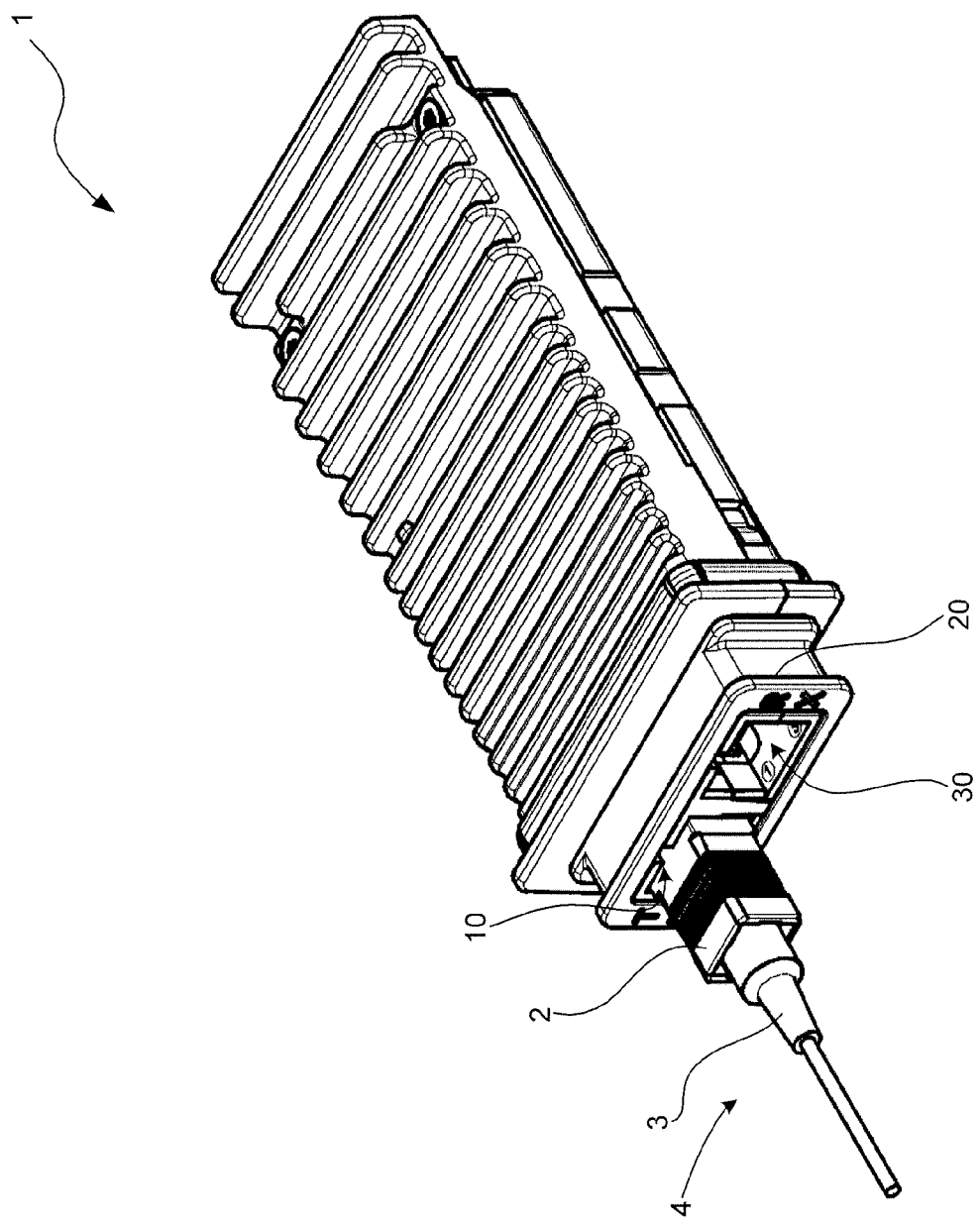
FIG. 1 illustrates a perspective view of the transceiver of the invention in accordance with an illustrative embodiment that incorporates the receptacle having the floating port assembly.

FIG. 1 illustrates a perspective view of the transceiver 1 of the invention in accordance with an illustrative embodiment. The transceiver 1 has a receptacle 10 that receives a plug or connector 2, which is attached to a boot 3 of a jacketed optical fiber cable 4. The jacketed optical fiber cable 4 is commonly referred to as a fiber patch cord. The receptacle 10 is depicted for illustrative purposes as being part of a duplex receptacle 20. The receptacle 10 is the transmitter receptacle and the receptacle 30 is the receiver receptacle. Thus, the receptacle 10 is used for launching optical signals from the transceiver 1 into the end (not shown) of the optical fiber attached to the transmitter port assembly within the receptacle 10. The receiver receptacle 30 is used for receiving light in the receiver port of the transceiver 1 transmitted from the optical fiber cable 4 to the transceiver 1 and coupled from the end of the fiber into optics (not shown) of the transceiver 1.

Figure 2:
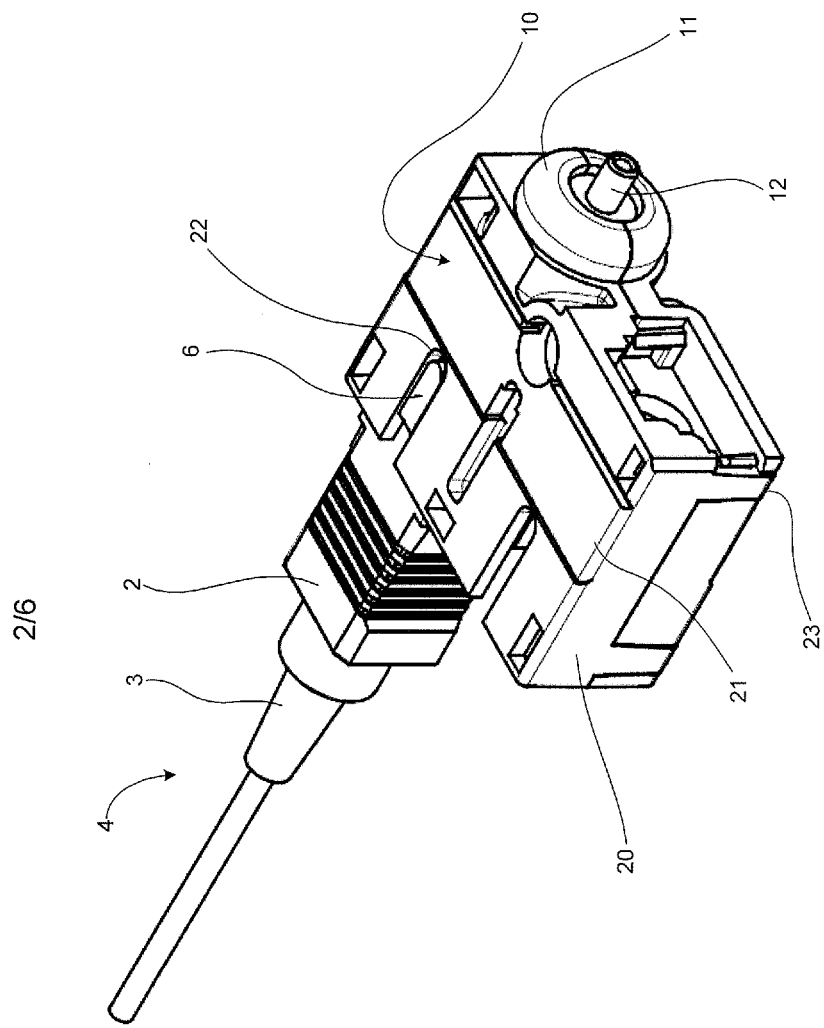
FIG. 2 illustrates a top rear (transceiver side) perspective view of the duplex receptacle of the transceiver shown in FIG. 1 having a connector of an optical fiber cable connected to it.

FIG. 2 illustrates a top rear (transceiver side) perspective view of the duplex receptacle 20 shown in FIG. 1 having the connector 2 of the optical fiber cable 4 connected to it. The duplex receptacle 20 has an upper cage portion 21 and a lower cage portion 23, which are secured together to form the housing of the duplex receptacle 20. The transmitter receptacle 10 has one or more keying mechanisms 22 formed therein that mate with one or more keying mechanisms 6 formed on the connector 2 to secure the connector 2 to the receptacle 10. The rear portion 11 (transceiver side opposite connector side) of the receptacle 10 includes a fiber pigtail mount 12 for receiving an optical fiber pigtail (not shown) on the transceiver side. When the pigtail is mounted to the mount 12, the end of the fiber (not shown) of the pigtail is contained within a fiber stub (not shown) of the transmitter port, as described below with reference to FIG. 5. The other end of the fiber stub is in abutment with an end of the ferrule of the optical fiber cable 4 to achieve optical coupling between the two fibers. The components of the transmitter port assembly and the manner in which optical coupling efficiency is achieved will now be described in detail with reference to FIGS. 3-6B.

Figure 3:
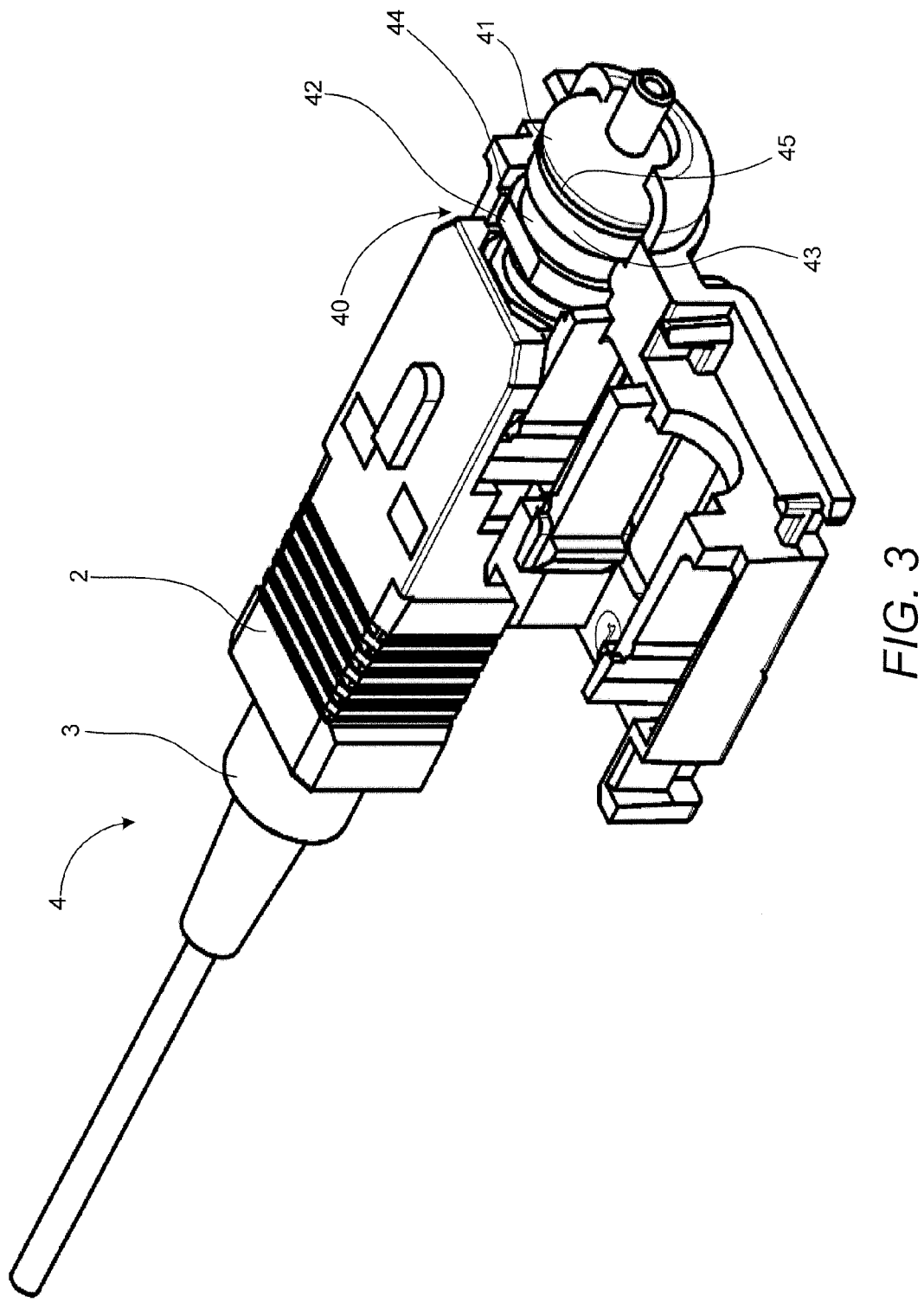
FIG. 3 illustrates a top rear (transceiver side) perspective view of the duplex receptacle shown in FIG. 2 with the upper cage portion removed to reveal some of the components of the floating transmitter port assembly.

FIG. 3 illustrates a top rear (transceiver side) perspective view of the duplex receptacle 20 shown in FIG. 2 with the upper cage portion 21 removed to reveal some of the components of the floating transmitter port assembly 40. The floating transmitter port assembly 40 includes a generally cylindrically shaped port housing 41 having a front flange 42 and a rear flange 43, an indented portion 44 between the front and rear flanges 42 and 43, and a sleeve, which is not visible in FIG. 3. The flanges 42 and 43 extend circumferentially about the port housing 41. A return-to-zero (RTZ) spring device 45, which may be an O-ring or similar device, functions as the spring-return mechanism. The device 45 is secured via a race about the rear portion 46 of the housing 41. As described below with reference to FIG. 5, the race that secures the RTZ spring device 45 comprises the inner surface of the upper cage portion 21 and the rear flange 43. The RTZ spring device 45, when secured in the race, abuts the rear flange 43.

Figure 4:
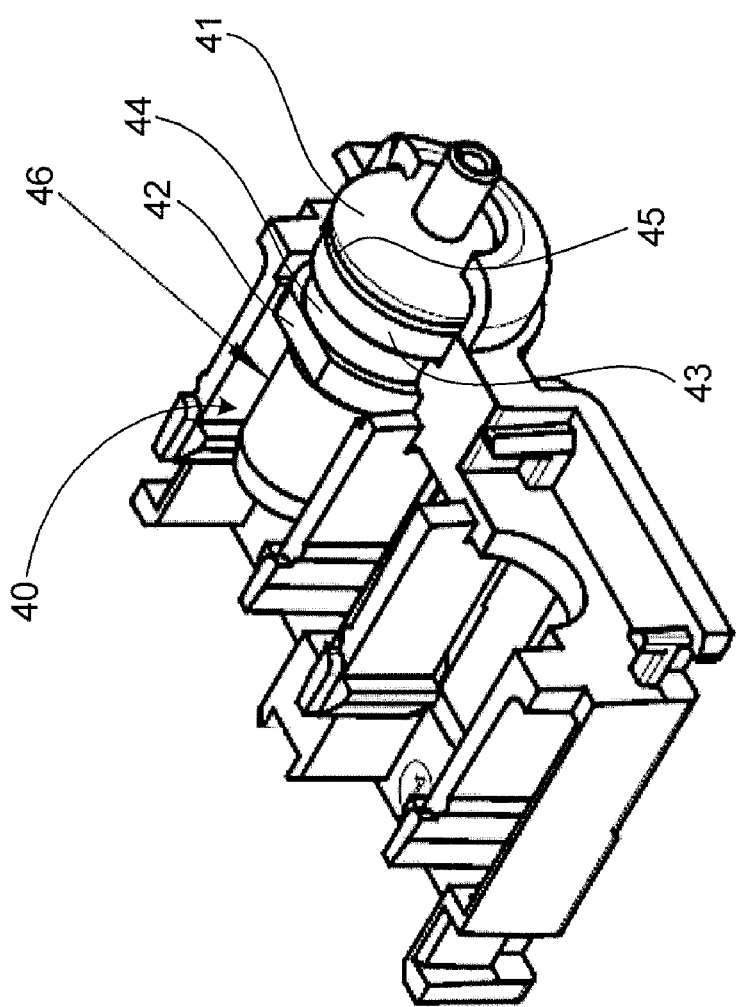
FIG. 4 illustrates a top rear (transceiver side) perspective view of the receptacle shown in FIG. 2 having the top cage portion removed to show the components of the floating port assembly.

FIG. 4 illustrates a top rear (transceiver side) perspective view of the transmitter receptacle 10 having the top cage portion 21 removed, which shows the components of the transmitter port 40. The port assembly housing 41 has a solid sleeve 46 that has an outer generally cylindrical surface and an inner generally cylindrical surface. The rear end of the sleeve 46 coincides with the front side of the front flange 42. The other portions 43 and 44 are depicted as shown in FIG. 3.

Figure 5:
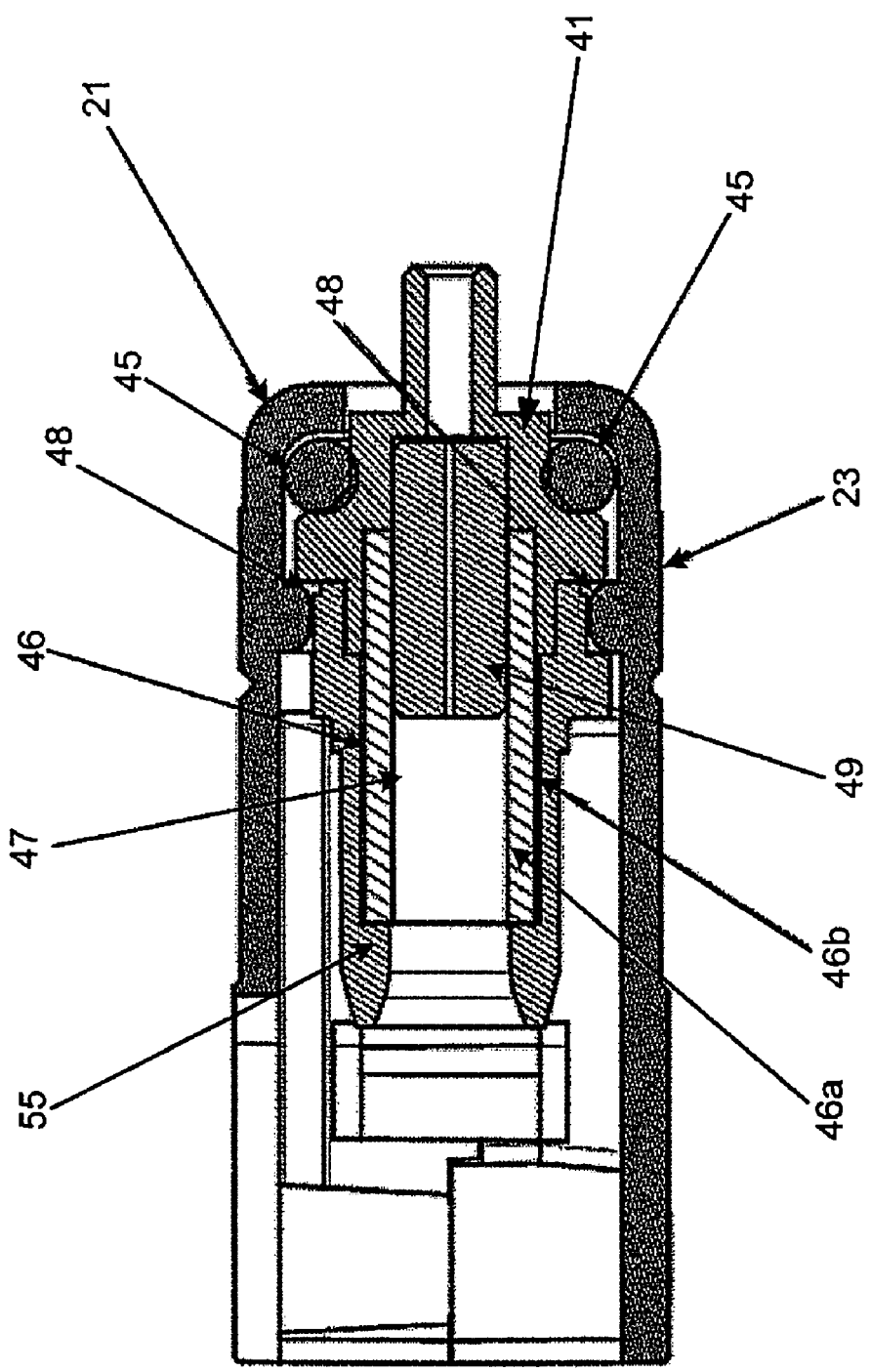
FIG. 5 illustrates a side cross-sectional view of the receptacle shown in FIG. 2 that shows the components of the floating port assembly and the ferrule of the cable.

FIG. 5 illustrates a side cross-sectional view of the transmitter receptacle 10 that shows the components of the transmitter port 40 and the ferrule of the cable 4. The sleeve 46 has an inner surface 46*a* and an outer surface 46*b*. The inner surface 46*a* of the port sleeve 46 is in contact with and surrounds the ferrule 47 of the optical fiber cable 4. The inner surface 46*a* of the sleeve 46 has an inner diameter that is sized to match the outer diameter of the ferrule 47. A circumferential locking mechanism 55 of the port housing 41 secures the sleeve 46 within the housing and prevents movement of the assembly 40 in the axial direction of the sleeve 46. The rear end (transceiver side) of the ferrule 47 abuts a front end (cable side) of a fiber stub 49. The rear portion of the sleeve 46 is in contact with and surrounds the fiber stub 49. The fiber stub 49 has a coaxial opening formed therein that extends from the rear end to the front end of the stub 49.

As described above with reference to FIG. 2, the fiber (not shown) of the pigtail that is mounted to the pigtail mount 12 on the transceiver side has an end that is contained within the fiber stub 49. Light propagates from the pigtail fiber on the transceiver side to the cable fiber on the cable side. It is at the location of the abutment between the ferrule 47 and the fiber stub 49, referred to herein as the abutment coupling location, that mechanical loading on the optical fiber cable can result in wiggle that results in optical losses. Thus, the efficiency of this abutment coupling is extremely important. As is known in the optical fiber industry, ferrules are designed with freedom to rotate angularly about the axis of the fiber when they are in abutment with a fiber stub within a receptacle. Often times, however, ferrules do not have adequate rotational freedom when they are placed in abutment. This lack of adequate rotational freedom often results in wiggle at the abutment coupling location when a mechanical load is placed on the cable. The invention obviates this problem.

As stated above, the transmitter port 40 has an RTZ spring device 45 that is secured in a race formed by the rear flange 43 and the inner surface of the upper cage portion 21, as shown in FIG. 5. The RTZ spring device 45 extends around the circumference of the rear portion of the port assembly housing 41. The RTZ spring device 45 allows the transmitter port assembly 40 to float angularly relative to the axis of the fiber, which is coaxial with the axis of ferrule 47 and with the axis of the fiber stub 49. Consequently, when a mechanical load is placed on the cable that results in an angular moment being placed on the ferrule 47, the port assembly 40 rotates on the RTZ spring device 45 to compensate for any lack of rotation by the ferrule 47. Once the angular moment no longer exists, the RTZ spring device 45 allows the port assembly 40 to return to its original center position. If the ferrule 47 has adequate rotational freedom, the port assembly 40 does not rotate. Thus, the port assembly 40 rotates only to the degree necessary to compensate for a lack of rotational freedom of the ferrule 47. A pivot mechanism 48 formed on the upper and lower cage portions 21 and 23 restrains the port assembly 40 from moving too far from its center position. The port assembly 40 typically is allowed to move anywhere from 2° to 4°, although the invention is not limited with respect to the degree of freedom that is provided to the port assembly 40.

FIG. 6A illustrates a diagram that depicts the axial alignment of the sleeve 46, the ferrule 47, and the fiber stub 49 when the port assembly is in its center position, i.e., no angular moment is being exerted on the sleeve 46 by the ferrule 47. When the port assembly 40 is in its center position, the axes of the sleeve, 46, the ferrule 47 and the fiber stub 49 all are coaxially aligned with a center axis 51 of the port. The end of the ferrule 47 is in abutment with the end of the fiber stub 49 at the abutment coupling location 52. In this position, the optical axis 53 of the port coincides with the center axis 51 of the port, and these axes also coincide with the axes of the sleeve 46, ferrule 47 and fiber stub 49.

FIG. 6B illustrates the same diagram shown in FIG. 6A except that the port assembly has moved some angular distance relative to the port center axis 51 due to the exertion of an angular moment on the sleeve 46 by the ferrule 47. The axes of the sleeve 46, ferrule 47 and fiber stub 49 still coincide with each other and with the optical axis 53 of the port, i.e., they are all coaxially aligned. The optical axis 53 of the port, however, no longer coincides with the center axis 51 of the port. Nevertheless, the abutment coupling at the abutment coupling location has not changed. Consequently, no coupling efficiency has been lost because the axes of the sleeve 46, ferrule 47 and fiber stub 49 remain aligned with each other. The abutment coupling is essentially isolated from the moment exerted on the ferrule 47 because the optical axis 53 and the axes of the sleeve 46, ferrule 47 and fiber stub 49 all move together in an arc by equal amounts to remain in alignment. The port assembly 40 is allowed to move in any angular direction relative to the port center axis 51, i.e., the port assembly 40 has freedom to move conically relative to the port center axis 51. The amount of movement that is allowed is determined by the pivot mechanism 48. As stated above, the spring-return mechanism 45 returns the port assembly 40 to its center position (i.e., the axis 51 and 53 are in alignment) when the bending moment is released, allowing the port assembly 40 to return to its center position in the receptacle 10.

While the invention has been described with reference to a transmitter receptacle, the invention applies equally to receiver receptacles, and is not limited to duplex receptacles. The invention also is not limited with respect to the type of connector that the receptacle is designed to receive. In addition, the invention also applies to receptacles that are configured to receive a laser device on the transceiver side rather than a pigtail fiber. Many receptacles receive, on the transceiver side, a laser that is driven by circuitry of the transceiver. The floating port assembly of the invention could be used in these types of receptacles as well. Also, while the invention has been described with reference to the case where the port assembly uses a solid sleeve, the invention applies equally to cases where the port assembly uses a split sleeve. In both cases, the floating nature of the port assembly will provide the benefits described herein.

It should be noted that the invention has been described with reference to a few illustrative embodiments. The invention, however, is not limited to these embodiments. As will be understood by those skilled in the art, in view of the description provided herein, many modifications may be made to the embodiments described herein, and all such modifications are within the scope of the invention.

What is claimed is:

1. A receptacle for use in receiving a connector of an optical fiber cable, the receptacle comprising:
   a receptacle housing having an inner surface and an outer surface; and
   a floating port assembly housed within the receptacle housing, the floating port assembly defining a port, the port having an optical axis and a center axis, the floating port assembly having a cylindrical sleeve for receiving a ferrule of an optical fiber cable and an outer surface, the outer surface of the floating port assembly having one or more features thereon that engage one or more features on the inner surface of the receptacle housing to thereby secure the floating port assembly and the receptacle housing in locking engagement with each other, the sleeve having an inner surface that is in contact with and surrounds at least a portion of the ferrule when a connector of the optical fiber cable is connected to the receptacle, the sleeve having an axis that is coaxial with the port center axis, the port optical axis being coaxial with the port center axis when the port assembly is in a center position, the port assembly including a spring-return mechanism, wherein when the floating port assembly is in locking engagement with the receptacle housing, the spring-return mechanism allow the port assembly to move angularly relative to the port center axis from the center position of the port assembly if an angular mechanical moment is exerted on the port assembly, the spring-return mechanism returning the port assembly to the center position if the angular mechanical moment is removed.

2. The receptacle of claim 1, wherein the sleeve is a solid sleeve, the inner surface of the sleeve having a diameter that is sized to precisely match the outer surface of the ferrule.

3. The receptacle of claim 1, wherein the sleeve is a split sleeve, the split sleeve being compressed about a portion of the outer surface of the ferrule such that the inner surface of the compressed sleeve precisely matches the outer surface of the ferrule.

4. The receptacle of claim 1, wherein the floating port assembly has a rear flange on the outer surface thereof proximate a rear portion of the assembly, the spring-return mechanism comprising a return-to-zero (RTZ) spring in a shape of an O-ring secured about a circumference of the rear portion of the assembly adjacent the rear flange, wherein when the floating port assembly is in locking engagement with the receptacle housing, at least one of said features on the inner surface of the receptacle housing is in contact with the spring such that the rear flange and said at least one of said features on the inner surface of the receptacle housing form a chase that secures the spring within the receptacle housing.

5. The receptacle of claim 1, wherein the floating port assembly has a front flange on the outer surface of the assembly proximate a front portion of the assembly, at least one of said features on the inner surface of the receptacle housing being in contact with or in close proximity to the front flange such that movement of the floating port assembly relative to the port center axis is restrained by said at least one of said features on the inner surface of the receptacle housing coming into contact with the front flange if the floating port assembly moves a particular distance relative to the port center axis.

6. The receptacle of claim 1, wherein the floating port assembly further comprises:
   a pigtail mount; and
   a fiber stub having a front end and a rear end, the front end of the fiber stub being in coupling abutment with a rear end of the ferrule when a connector of the optical fiber cable is connected to the receptacle, the fiber stub having an axis that is coaxially aligned with the axis of the sleeve.

7. The receptacle of claim 1, wherein the receptacle is a transmitter receptacle.

8. The receptacle of claim 1, wherein the receptacle is a receiver receptacle.

9. The receptacle of claim 1, wherein the receptacle is a duplex receptacle having a transmitter receptacle and a receiver receptacle, the receptacle housing and the floating port assembly being within the receiver receptacle.

10. A method for maintaining optical coupling alignment within a receptacle configured to receive a connector of an optical fiber cable, the method comprising:
   connecting a connector of an optical fiber cable to a port of a receptacle housing of the receptacle, the receptacle housing having a port assembly housed therein, the port assembly defining a port, the port having an optical axis and a center axis, the floating port assembly having a cylindrical sleeve for receiving a ferrule of an optical fiber cable and an outer surface, the outer surface of the floating port assembly having one or more features thereon that engage one of more features on the inner surface of the receptacle housing to thereby secure the floating port assembly and the receptacle housing in locking engagement with each other, the sleeve having an inner surface that is in contact with and surrounds at least a portion of the ferrule when a connector of the optical fiber cable is connected to the receptacle, the sleeve having an axis that is coaxial with the port center axis, the port optical axis being coaxial with the port center axis when the port assembly is in a center position, the port assembly including a spring-return mechanism, wherein when the floating port assembly is in locking engagement with the receptacle housing, the spring-return mechanism allow the port assembly to move angularly relative to the port center axis from the center position of the port assembly if an angular mechanical moment is exerted on the port assembly, the spring-return mechanism returning the port assembly to the center position if the angular mechanical moment is removed.

11. The method of claim 10, wherein the sleeve is a solid sleeve, the inner surface of the sleeve having a diameter that is sized to precisely match the outer surface of the ferrule.

12. The method of claim 10, wherein the sleeve is a split sleeve, the split sleeve being compressed about a portion of the outer surface of the ferrule such that the inner surface of the compressed sleeve precisely matches the outer surface of the ferrule.

13. The method of claim 10, wherein the floating port assembly has a rear flange on the outer surface thereof proximate a rear portion of the floating port assembly, the spring-return mechanism comprising a return-to-zero (RTZ) spring in a shape of an O-ring secured about a circumference of the rear portion of the assembly on the outer surface of the assembly adjacent the rear flange, at least one of said one or more features on the inner surface of the receptacle housing being in contact with the spring such that the rear flange and said at least one of said one or more features on the inner surface of the receptacle housing form a chase that secures the spring within the receptacle housing.

14. The method of claim 10, wherein the floating port assembly has a front flange on the outer surface of the assembly proximate a front portion of the assembly housing, at least one of said features on the inner surface of the receptacle housing being in contact with or in close proximity to the front flange such that movement of the floating port assembly relative to the port center axis is restrained by said at least one of said features on the inner surface of the receptacle housing coming into contact with the front flange if the floating port assembly moves a particular distance relative to the port center axis.

15. The method of claim 10, further comprising:
connecting an end of a transceiver fiber to a pigtail mount of the port assembly such that the end of the fiber is contained within a fiber stub of the port assembly, the fiber stub having a front end and a rear end, the front end of the fiber stub being in coupling abutment with a rear end of the ferrule when a connector of the optical fiber cable is connected to the receptacle, the fiber stub having an axis that is coaxially aligned with the axis of the sleeve.

16. The method of claim 10, wherein the receptacle is a transmitter receptacle.

17. The method of claim 10, wherein the receptacle is a receiver receptacle.

18. The method of claim 10, wherein the receptacle is a duplex receptacle having a transmitter receptacle and a receiver receptacle, the receptacle housing the floating port assembly being within the receiver receptacle.

* * * * *

UNITED STATES PATENT AND TRADEMARK OFFICE
CERTIFICATE OF CORRECTION

PATENT NO. : 7,347,630 B1 Page 1 of 1
APPLICATION NO. : 11/567556
DATED : March 25, 2008
INVENTOR(S) : Yong M. Jeon et al.

It is certified that error appears in the above-identified patent and that said Letters Patent is hereby corrected as shown below:

Column 5, Line 57, Claim 1, after "sleeve" insert -- of the floating port assembly --;

Column 5, Line 67, Claim 1, delete "allow" and insert -- allows --;

Column 8, Line 66, Claim 10, delete "of" and insert -- or --;

Column 7, Line 12, Claim 10, delete "allow" and insert -- allows --;

Column 8, Line 32, Claim 18, after "housing" insert -- and --.

Signed and Sealed this

Eighth Day of June, 2010

David J. Kappos
*Director of the United States Patent and Trademark Office*